June 23, 1953 E. G. JOHANSSON 2,643,362
DEVICE FOR INSULATING A JACK
Filed Dec. 11, 1948
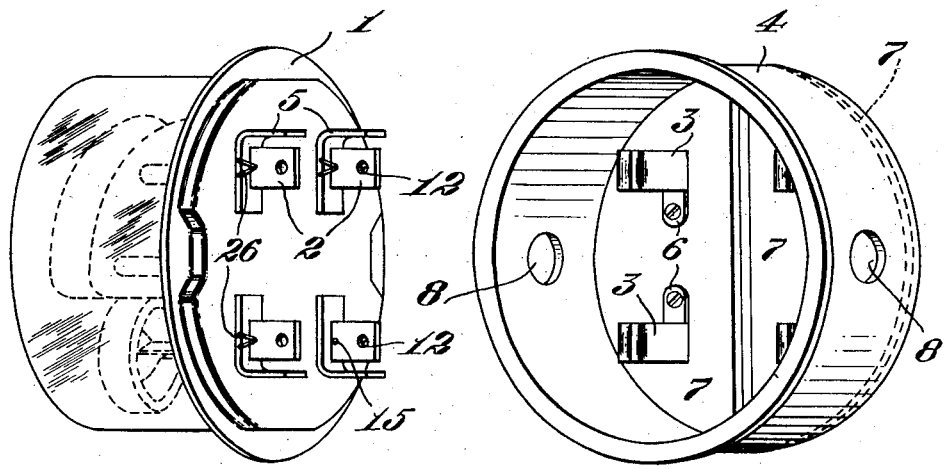
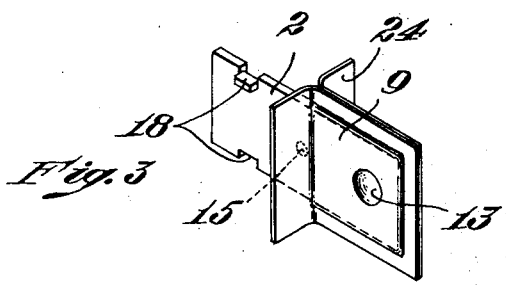
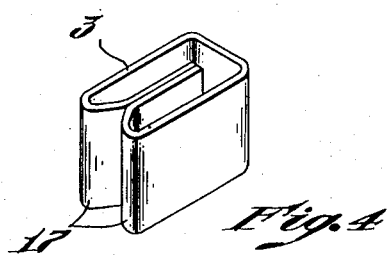
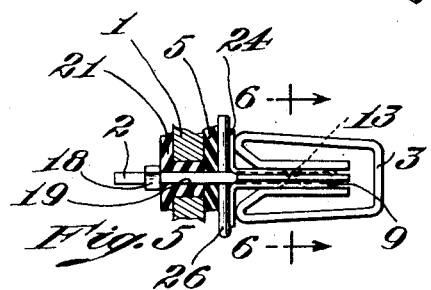
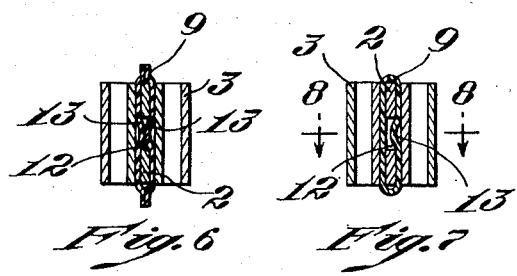
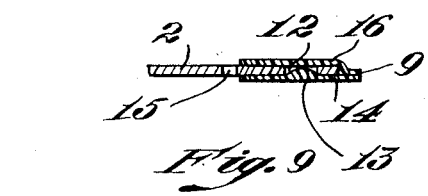
Inventor
Ernest G. Johansson
by Roberts, Cushman & Grover
Att'ys Patented June 23, 1953

2,643,362

UNITED STATES PATENT OFFICE 2,643,362

DEVICE FOR INSULATING A JACK

Ernest G. Johansson, Belmont, Mass., assignor to Anchor Manufacturing Company, Boston, Mass., a corporation of Massachusetts Application December 11, 1948, Serial No. 64,733

3 Claims. (Cl. 339—36)

This invention relates to a device for interrupting an electrical circuit through electrical connectors such as a plug and jack, while the connectors are in normal closed-circuit position. The invention has particular application to detachable watt-hour meters of the American standard type "S" which includes a terminal base containing clip receptacles and a meter casing carrying terminal or contact blades adapted to fit in the receptacles when the casing is attached to the base. The blades are mounted on the case by inserting them therethrough and securing them in place with a cotter pin or similar retaining means which is disposed on the blade close to or touching the jaws of the clip receptacle when the blades are inserted in the receptacle. Such meters are designed for installation between public utility power lines and, for example, a household electrical circuit, the base being mounted at the household or other premises. Commonly the blades are perforated for storing the meter on rods passing through the perforations. However, when service to particular premises is to be disconnected, usually temporarily, it is desirable that the meter be left at the place of installation rather than removed for storage.

Heretofore it has been necessary either to disconnect the line or load leads from the terminals within the meter base or to provide disconnecting means within the base. In the first instance the wires must be removed from the terminals and taped at the time of service interruption, and later untaped and reconnected when the service is to be resumed. It is desirable that some quicker, simpler disconnecting means be employed. However, because of the great number of meters in service, it is impractical and expensive to replace the existing bases with a switch type of internal disconnector.

Objects of the present invention are to provide a quick and easy means for electrically disconnecting the meter from the base while leaving the meter attached to the base in normal position, which is applicable to various manufactures of meters without internal changes therein, which is simple and efficient in operation, and which is economical to manufacture.

The present invention involves a sheath or cover of insulating material which fits over one end of the blade and which carries an abutment opposed to an abutment on the blade, so that the sheath is held in position while the blade is being inserted into or withdrawn from the receptacle. The abutment on the blade may be the wall of the perforation therethrough, or a raised surface portion of the blade. Preferably the abutment on the sheath is an interiorly directed portion of a resilient sheath which may be snapped into holding position. The sheath may be formed of two opposed sheets joined together or of one integral piece. One sheet may be stiffer than the other, in which case the abutment is preferably on the stiff sheet. It is desirable to provide hinged flaps extending from the mouth of the sheath which may be folded at an angle to the mouth to aid insertion of the blade in the sheath, the extensions remaining so folded to insulate the aforesaid retaining means from the receptacle.

For the purpose of illustration typical embodiments of the invention are illustrated in the accompanying drawings in which Fig. 1 is an isometric view of a detachable meter;

Fig. 2 is an isometric view of the corresponding meter base;

Fig. 3 is an isometric view of the blade shown in Fig. 1 illustrating one embodiment of the invention;

Fig. 4 is an isometric view of the clip receptacle shown in Fig. 2;

Fig. 5 is a plan view of the blade inserted in the receptacle;

Fig. 6 is a section on line 6—6 of Fig. 5;

Fig. 7 is a section like Fig. 6 showing another embodiment of the invention;

Fig. 8 is a section on line 8—8 of Fig. 7; and

Fig. 9 is a section like Fig. 8 showing still another embodiment of the invention.

As shown in the drawings the meter installation comprises a meter case 1 carrying the contact blades 2 which are designed to be inserted in the clip receptacles 3 carried on the meter base 4. The receptacles 3 and their associated terminals 6 are insulated from the meter base 4 by mounting plates 7. Suitable entrances 8 are provided for conductors leading from the terminals 6 to the power line and the electrical load whose power consumption is measured. Angle pieces 5 insulate the blade retaining pin 26 from the case 1 and help to position the case and blades as they are fitted to the base. When the meter case is fitted to the terminal base with the blades inserted in the receptacles, the case may be fastened and sealed on the base by means of a flanged metal strap (not shown).

As shown in Figs. 3 and 5, the blade has flanges 18 and a cotter-pin hole 15. Each blade is inserted through an insulating washer 21 which fits in an aperture 19 in the case 1 and through the angle piece 5 so that the flanges 18 butt against an inside surface of the washer. A cotter pin 26 is then inserted through the hole 15 in the blade to hold the blade firmly in position. Usually the dimensions of the case and base and the positions of the blades and clips relative thereto are chosen so that the cotter pin passing through each blade does not touch the clip receptacle when the case is mounted on the base.

The embodiment of the invention shown in Figs. 3, 5 and 6 comprises a sheath 9 of insulating material which slips over the end of the blade 2. The sheath 9 is sufficiently thin so that when the blade is inserted in the clip receptacle 3 the receptacle is not unduly distorted. A thickness of 0.012 inch is suitable. The sheath may be formed of two sheets of a resilient vinyl polymer such as is sold under the trade name "Vinylite" three of whose edges are joined by adhesive or thermal means.

Should it be necessary to discontinue service through the meter the meter case is unfastened and removed from the base and if, for example, single phase current is supplied, a sheath may be placed on either of the blades fitting into the clips connected with the line or the load conductors. However, where it is desirable to keep the potential coil of the meter energized for drying purposes an insulating sheath is placed on each of the loadside blades. In a three or more phase system two or more sheaths are effective to disconnect the line from the load.

The present invention involves an abutment formed in the sheath which fits in a perforation 12 in the blade 2. The abutment may be a dimple 13 raised on the interior surface of the sheath and disposed to fit in the perforation 12 of the blade. The dimple may be placed on opposing inner faces of the sheath, as shown in Figs. 5 and 6, or on only one face, as shown in Figs. 7 to 9. Whether one or two dimples are used, the sheath may be formed of two sheets, as shown in Figs. 3, 5, 6 and 9, or it may be molded in one integral piece as in the embodiment illustrated in Figs. 7 and 8.

A further embodiment is illustrated in Fig. 9 in which the sheath is formed of one stiff plastic sheet 14 and one resilient plastic sheet 16, the dimple being formed on the inner surface of the stiff sheet. The resilient sheet 16 allows the sheath to deform sufficiently for the dimple to snap in place in the perforation, while the stiff sheet tends to hold the dimple more firmly therein.

According to the embodiment of the invention illustrated in Figs. 3, 5 and 8 the sheath may be provided with a pair of hinged flaps or flexible extensions 24 which can be disposed at an angle to the mouth of the sheath. The extensions are spread apart to aid insertion of the blade into the sheath and are left in this position so that they cover all portions of the cotter pin 26 which might make contact with the jaws 17 of the receptacle 3 if the meter case and base have not been constructed with dimensions which insure a spacing between the jaws and the pins as hereinbefore described. Should the sheath remain in the receptacle when the blade is withdrawn the extensions 24 may be gripped manually and the sheath easily withdrawn. The extensions may be incorporated with the two-sheet construction of Figs. 3, 5, 6 and 9 or the integral sheath of Figs. 7 and 8.

A sheath formed according to the present invention has the advantage that it may be positioned properly on the blade, so that it tends to prevent the blade from punching through the sheath and also prevents the sheath from sticking in the clip receptacle when the blade is withdrawn or from being accidentally dislodged from the blade after it is withdrawn from the clip. The flexible extensions facilitate the use of the sheath and insure adequate insulation between the cotter pin and the receptacle.

It should be understood that the present disclosure is for the purpose of illustration only and that this invention includes all modifications and equivalents which fall within the scope of the appended claims.

I claim:

1. In the art of detachable electric meters of the type comprising a meter case carrying a contact blade and a meter terminal base carrying a clip receptacle having jaws adapted to receive the blade and said blade having retaining means adjacent the case and opposed to the jaws of the receptacle, a detachable device for insulating the blade from the receptacle while the blade is inserted therein comprising a detachable flat, two sided sheath of flexible, dielectric material, said sheath having its sides connected and having a closed end and an open end, the closed end and sides being externally substantially unobstructed so as to allow the blade when enclosed by the sheath to be slidably received in said jaws and retained therein, the sides at the open end of the sheath being extended beyond the body of the sheath and having their edges unconnected so that the extensions are freely foldable outwardly to assist in guiding the blade into the sheath and to insulate the retaining means from the receptacle as well as provide means for pulling the sheath from the blade or jaws.

2. In the art of detachable electric meters of the type comprising a meter case carrying a contact blade and a meter terminal base carrying a clip receptacle having jaws adapted to receive the blade and said blade having retaining means adjacent the case and opposed to the jaws of the receptacle, a detachable device for insulating the blade from the receptacle while the blade is inserted therein comprising a flat, two sided insulating sheath of thin sheet material, the two sides being fast together at one end and adhesively joined together face to face along their margins from said end part way toward the other end to form a pocket to receive a meter blade, the other ends of said sides being unconnected along their margins to form flaps adapted to flex out between the ends of the receptacle jaws and said retaining means when the sheathed blade is inserted in the jaws.

3. In the art of detachable electric meters of the type comprising a meter case carrying a contact blade and a meter terminal base carrying a clip receptacle having jaws adapted to receive the blade and said blade having retaining means adjacent the case and opposed to the jaws of the receptacle, a detachable device for insulating the blade from the receptacle while the blade is inserted therein comprising two rectangular sheets of insulating material joined together along one end and along their adjacent edges from said end part way toward the other end to form a pocket to receive a meter blade, the other ends of the sheets being unsecured to form flaps adapted to flex out between the ends of the receptacle jaws and said retaining means when the sheathed blade is inserted in the jaws.

ERNEST G. JOHANSSON.

References Cited in the file of this patent

UNITED STATES PATENTS

| Number | Name | Date |
|---|---|---|
| Re. 21,148 | Mylius | July 11, 1939 |
| 598,109 | Osgood et al. | Feb. 1, 1898 |
| 881,683 | Hatfield | Mar. 10, 1908 |
| 1,064,833 | Hubbell | June 17, 1913 |
| 1,965,151 | Mueller | July 3, 1934 |
| 2,105,396 | Bakke | Jan. 11, 1938 |
| 2,115,429 | Rypinski | Apr. 26, 1938 |
| 2,126,602 | Bakke | Aug. 9, 1938 |
| 2,369,735 | Heit | Feb. 20, 1945 |